(12) United States Patent
Krein et al.

(10) Patent No.: US 10,957,304 B1
(45) Date of Patent: Mar. 23, 2021

(54) EXTRACTING CONTENT FROM AUDIO FILES USING TEXT FILES

(71) Applicant: Audible, Inc., Newark, NJ (US)

(72) Inventors: Timothy Krein, Chester, NH (US); Pooja Chitrakar, Burlington, MA (US); Yiming Zhao, Cambridge, MA (US)

(73) Assignee: Audible, Inc., Newark, NJ (US)

( * ) Notice: Subject to any disclaimer, the term of this patent is extended or adjusted under 35 U.S.C. 154(b) by 163 days.

(21) Appl. No.: 16/365,174

(22) Filed: Mar. 26, 2019

(51) Int. Cl.
| | | |
|---|---|---|
| *G10L 13/00* | (2006.01) | |
| *G10L 13/06* | (2013.01) | |
| *G10L 13/10* | (2013.01) | |
| *G06F 16/683* | (2019.01) | |
| *G06F 40/253* | (2020.01) | |
| *G10L 13/08* | (2013.01) | |

(52) U.S. Cl.
CPC ............ *G10L 13/10* (2013.01); *G06F 16/685* (2019.01); *G06F 40/253* (2020.01); *G10L 2013/083* (2013.01)

(58) Field of Classification Search
None
See application file for complete search history.

(56) References Cited

U.S. PATENT DOCUMENTS

| | | | |
|---|---|---|---|
| 9,269,347 B2* | 2/2016 | Latorre-Martinez | ... G10L 13/08 |
| 9,454,963 B2* | 9/2016 | Latorre-Martinez | ......................... G10L 13/033 |
| 9,959,657 B2* | 5/2018 | Latorre-Martinez | ... G06T 13/80 |
| 2010/0005388 A1* | 1/2010 | Haschart | ............... G06F 16/382 715/256 |
| 2014/0180935 A1* | 6/2014 | Rhoads | ................... G06F 16/93 705/311 |
| 2014/0210831 A1* | 7/2014 | Stenger | ................... G06T 13/40 345/474 |
| 2019/0043474 A1* | 2/2019 | Kingsbury | ............. G06N 3/006 |
| 2019/0196666 A1* | 6/2019 | Kurzweil | ............ G06F 3/04847 |

* cited by examiner

*Primary Examiner* — Satwant K Singh
(74) *Attorney, Agent, or Firm* — Eversheds Sutherland (US) LLP

(57) ABSTRACT

Devices and methods are provided for extracting content from audio files. The device may determine starting and ending quotation marks in a text file, and a string between the starting and ending quotation marks. The device may determine that a verb is near the starting quotation mark or the ending quotation mark. The device may determine, based on the verb, that the string is attributed to a character name in the text file. The device may determine a first time in a first audio file including an audio representation of the text file, and may determine a second time in the first audio file, wherein the first time is before the first word and the second time is after the second word. The device may generate a second audio file by extracting audio from the first audio file based on the first and second times.

20 Claims, 6 Drawing Sheets

US 10,957,304 B1

EXTRACTING CONTENT FROM AUDIO FILES USING TEXT FILES

BACKGROUND

Devices may execute applications which cause playback of audio to users and allow users to identify the audio. The audio may include quoted portions of books. However, some methods of generating audio representing quoted portions of books may result in the audio being difficult for a user to identify because the quoted portions may be incomplete or may include extra words from the book which are not included in a quote, or because a voice used by a device to play the audio may not correspond to a recognizable voice of a book character who said the quoted portion. Also, when creating applications which present audio representing quoted portions of books, a user may not be aware of which books may have available audio of quoted portions, resulting in difficulty in identifying books and their quoted portions.

Figure 1:
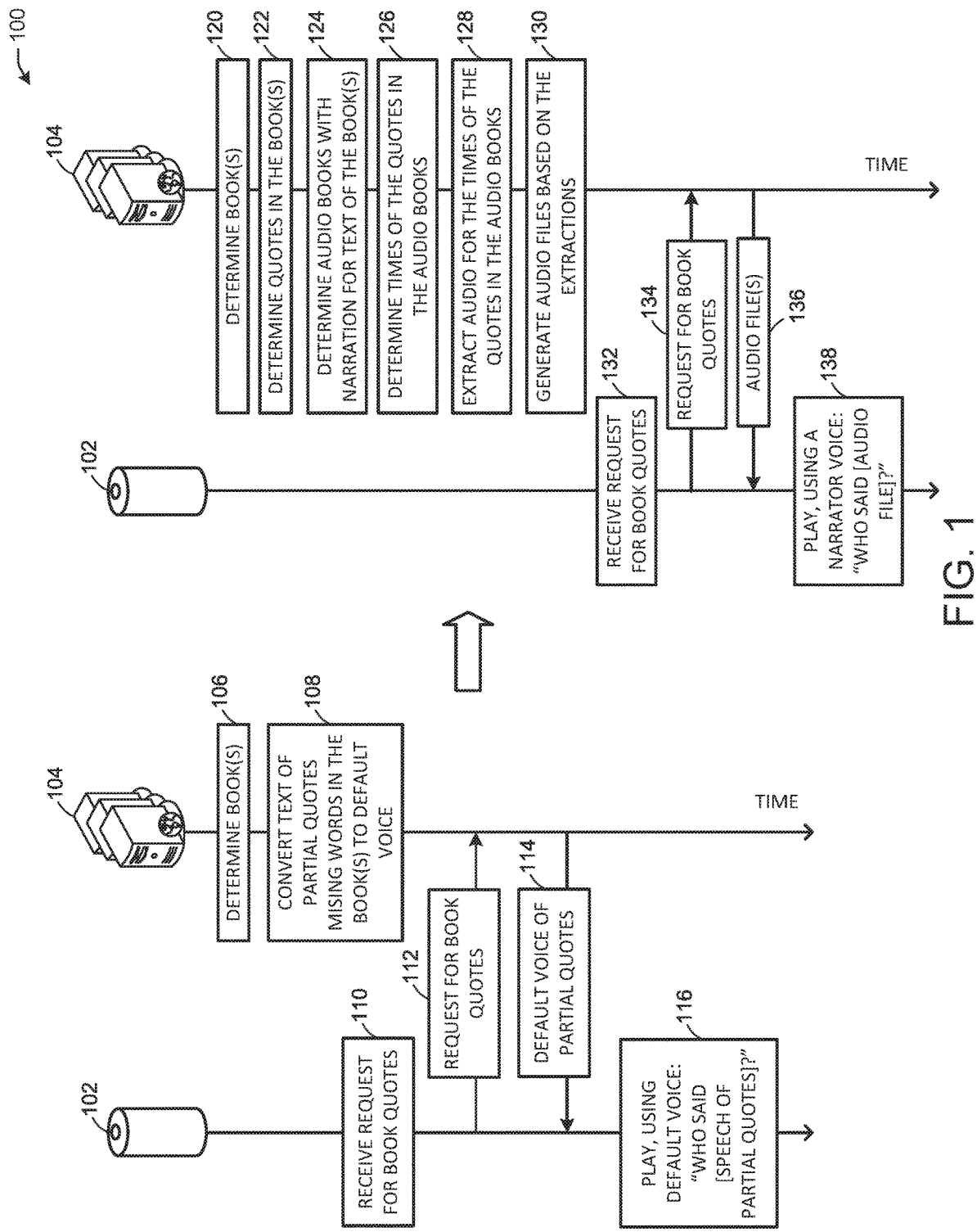
FIG. 1 illustrates an example process for generating audio files, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for extracting content from audio files using text files.

Devices may present audio to users and allow users to interact with the devices to identify the audio. For example, devices with a speaker may play audio files which include quotes from books, and users may guess which characters from a book, film, show, or other source may have said the quote. Devices also may allow users to create applications which cause playback of audio files including quotes. Users may select a book, an author, or a series, and the devices may identify and play audio files including quotes from characters in the book or series, or from books written by an author.

Some devices may use a text-to-speech method to convert text of a book to an audible output of a default voice which speaks the words of the text. Some text-to-speech methods may be unreliable for multiple reasons, however. For example, some text-to-speech methods may identify quotes imprecisely, missing quoted words or including words outside of a quote. Incomplete quotes or audio playback of quotes with extra non-quoted words may result in an audio playback of a quote being unidentifiable to a user. Some methods may curate quotes to determine whether a quote is complete and does not include extra non-quoted words or sounds. Such curation may include human interaction to listen to the audio representation of a quote, which may be time-consuming and inefficient for the generation of applications facilitating the presentation of audio quotes. In addition, some methods may use a default voice to render the audio quotes, and the default voice may not sound like the actual character who delivered a quote in a book. Not using an accurate audio representation of a character's voice to deliver an audio quote may result in a user struggling to identify a character associated with the quote.

Devices may allow users to create applications which present audio quotes from books, movies, shows, or other sources. Users may select a book, a book series, a film, a film series, an author, a narrator, an actor/actress, or a combination thereof, and devices may identify audio quotes based on the selection. For example, a user may provide a command such as, "Quiz me on Book X" to a device, and the device may respond by playing audio quotes from Book X and allowing users to provide their answers identifying which character from Book X said a quote. However, users may not be aware of which books, authors, or narrators have available audio quotes with which to create an application for identifying audio quotes.

Therefore, the generation of audio quotes using text files may be improved by using enhanced automation methods and by using a voice representative of the characters in the text, and the generation of applications for presenting and identifying audio quotes may be enhanced by reducing the need for users to be aware of which texts have available audio quotes.

In one or more embodiments, a device may analyze text files which include the text of electronic books. The device may identify quoted portions of the text files and create audio files which, when executed, play a voice representation of the quotes from the books. An application may be executed by a device and may allow users to select a book, an author, a series, or a narrator, and the device may present the audio files corresponding to the users' selections to the users, who may provide answers regarding which characters said a quote played by an audio file.

In one or more embodiments, to identify quotes in text files, the device may identify sets of quotation marks including a starting quotation mark and an ending quotation mark. The device may maintain an index of a location of any letter, punctuation mark, number, symbol, or word in a text file and the numerical location of the respective letter, punctuation mark, number, symbol, or word. The device may identify a starting quotation mark (e.g., a single ' or a double "), and may find the corresponding ending quotation mark (e.g., a single ' or a double "). Quotation marks may include "curly quotes" and other types of quotes, such as straight quotation marks (e.g., ' and " quotation marks). The device may identify the text in between the starting quotation mark and the ending quotation mark to determine a quote. For example, the device may identify a quote by identifying the first character in a text subsequent to a starting quotation mark and identifying the last character in the text prior to the ending quotation mark. In this manner, the device may ensure that any characters (e.g., letters or numbers) within a set of quotation marks are included in a quote, and that no characters or words outside of the quotation marks are included in a quote.

In one or more embodiments, to determine which character (e.g., a person or other type of being having a role in a story) in a text said a quote, the device may identify verbs near an identified quote, and may determine whether any nearby verbs are associated with speech or another form of communication. For example, the device may have access to a list of words associated with communication, including but not limited to "said, agreed, muttered, shouted, whispered, yelled," and "cried." The device may search for a matching communication verb within a threshold number of spaces or words from a quote. The device may identify a communication verb and may determine if the verb is within a number of spaces or words from a quotation mark or a word within an identified quote. The device may determine that the verb is not included in the quote. When the device identifies a communication verb within a threshold distance from the quote and not within the quote itself, the device may determine that the quote was said or otherwise communicated by a character.

In one or more embodiments, to determine which character of a text said a quote, the device may search for character names, nouns, or pronouns (e.g., aliases of character names) within a threshold number of words or spaces from an identified communication verb. The device may identify a string of letters beginning with a capital letter and matching a known character name or nickname of the text, or may determine a character name using the string of letters. When the device identifies a character name or nickname within a threshold distance from the communication verb, the device may attribute the quote to the character (e.g., determine that the character said the quote). When the device is unable to identify a character name within a threshold distance from the communication verb, the device may identify a noun or pronoun which may refer to a character in the text or an alias of the character. For example, if the device identifies the words "she said" in a text, the device may identify "said" as a communication verb, and may identify "she" as a pronoun within a threshold distance from the verb "said." However, the pronoun "she" may be more proximal to the verb than any character name, and the device may need to determine which character to whom the pronoun "she" refers. The device may identify the same pronoun or noun within a threshold number of spaces or words of the pronoun, or may identify the same noun or pronoun which is nearest to the noun or pronoun, and may continue to search within a threshold number of spaces or words for a character name or the same noun or pronoun until the device identifies the proximity of a character name to the noun or pronoun. The device may identify certain text, such as punctuation, which may help the device identify a character to whom to attribute a quote. For example, the device may identify a comma after the words in a quoted portion, which may indicate a transition from the quote to a mention of the character who said the quote.

In one or more embodiments, to generate an audio file with audio of a quote from a text, a device may use an audio representation of the text file for a book. For example, books may have audiobooks in which one or more narrators read the text and use character voices to deliver quotes from a book. The character voices, emphasis, and voice inflections from an audiobook may provide a more identifiable representation of an audio quote than an automated default voice which renders a text-to-speech output (e.g., a voice which sounds the same for any audio output generated from a text-to-speech conversion). The device may identify the times at which words in a text file are spoken in an audiobook file. For example, the location of characters or words in a text file may be indexed in a synchronization ("sync") file, which may include a corresponding time when the characters or words of a text file (e.g., a text file with text of a book) are spoken in an audiobook file. The device may identify the starting and ending times of a quote in an audiobook file by determining the corresponding times when the first word after a starting quotation in the text file is spoken and when the last word before an ending quotation in the text file is spoken. The device may identify the timing when the last word prior to a starting quotation mark is spoken in an audiobook file, and when the first word subsequent to an ending quotation mark is spoken in an audiobook file, and may extract the audio corresponding to the quote without including any audio before or after a quoted portion. If a quote is too short (e.g., if the number of words fails to exceed a threshold number of words or if the duration of the corresponding audio of the quote fails to exceed a time threshold), the device may combine the quote with another nearby quote said by the same character if the device identifies such a nearby quote. The device may create an audio file for any extracted portion or portions of the audiobook file corresponding to a quote in the text file.

In one or more embodiments, the device automatically may curate audio quotes to determine suitable audio quotes for use in an application. The device may convert extracted audio to text using an audio-to-text method. For example, the device may convert audio from analog to digital format and may divide the audio file into segments. The device may match the audio in the segments to phonemes, and may combine phonemes to identify sounds and corresponding words. The device may generate a text file with the converted audio-to-text, and may compare the text file to the identified and corresponding quote from the text file. When the text file and the quote do not match exactly, the device may discard the audio file. When the text file and the quote match exactly, the device may determine that the audio file with a quote is available for use by an application.

In one or more embodiments, the device may maintain available audio files for quotes of one or more books. The device may assign an identifier to a book, series, author, or narrator, and any audio file associated with the book, series, author, or narrator may be indexed with the identifier. When a user requests audio quotes from a book, series, author, or narrator, the device may determine the identifier associated with the book, series, author, or narrator, and may identify and send any audio quote files for the book, series, author, or narrator to be rendered.

In one or more embodiments, the device may determine which quotes are eligible for use by an application. For example, if a user provides a verbal command such as "Play quotes from Book X," the device may identify quotes from Book X and may provide any of the quotes for playback. However, a user's experience may be enhanced by the device selecting some quotes over other quotes. For example, quotes from characters who are more recognizable (e.g., are attributed to a number of quotes exceeding a threshold number of quotes) may be more identifiable by users than quotes from characters who are not mentioned often in a text or who have a few attributed quotes. The device may prevent the reuse of a quote or quotes from a particular character by maintaining a count of how many times the quote has been used in a time period or use of the application, or a count of how many quotes attributed to one character have been used in a time period or use of the application. If a use count for a quote or character does not exceed a threshold number of uses, the device may select and provide a quote for playback. The device may determine whether user answers identifying the character attributed to the quote are correct or incorrect. If a quote receives too many incorrect answers (e.g., the incorrect answers exceed a threshold number), the device may categorize the quote as difficult to identify. The device may maintain a record of easier and more difficult quotes, and may provide quotes based on difficulty levels input by a user or determined automatically by the device based on the accuracy of answers provided by one or more users identifying the characters who said the quotes.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for generating audio files, in accordance with one or more example embodiments of the present disclosure.

Referring to FIG. 1, the process 100 may include a device 102 for receiving inputs and rendering audio and/or video playback. The process 100 also may include one or more servers 104 in communication with the device 102, and which may receive inputs from the device 102 and provide audio for the device 102 to render.

Still referring to FIG. 1, the one or more servers 104 may determine one or more books with text files at step 106. The text files may include text of electronic books. The one or more servers 104 may convert the text of partial quotes missing words from the text files to a default audio voice at step 108. The one or more servers 104 may use a text-to-speech method to convert the text files to audio, but may not properly identify the quotes from the text files or properly convert the text to audio including all of the words from a quote. The one or more servers 104 may convert words outside of a quote in the text file to audio, resulting in an audio output of the quote and other words from the text file which may not have been spoken by a character. At step 110, the device 102 may receive a request for book quotes. For example, the request may identify a book, a series of books, an author, or a narrator. At step 112, the device 102 may send the request for book quotes to the one or more servers 104. At step 114, the one or more servers 104 may send audio in the form of a default voice including the partial quotes to the device 102 for playback. At step 116, the device 102 may play the audio files in a default voice. For example, the device 102 may play a narrator voice saying, "Who said" followed by the received default voice of the quote provided by the one or more servers 104, and the quote may be incomplete or may include extra words from the text file outside of the quote. In this manner, the quote may be difficult to identify and attribute to a character of a book. A process (e.g., a manual quote curation process) may be limited to selection of a small number of quotes and may not be suitable for extracting large numbers of quotes from audio files. The process 100 may be enhanced, however.

At step 120, the one or more servers 104 may determine one or more books having respective text files with the text of the books. At step 122, the one or more servers 104 may determine quotes in the one or more books by identifying text between respective quotation marks of the text files. At step 124, the one or more servers 104 may determine files of audio books for the text files, and the audio books may include one or more narrators' voices which may imitate the voices of characters when speaking quoted text from a book or may choose different ways to sound like a character (e.g., using different voice tones, pitches, accents, and other voice characteristics which may help a listener differentiate between spoken words of different characters). At step 126, the one or more servers 104 may determine the respective times when the quotes in the text files are spoken in the audiobook files. The one or more servers 104 may identify the first word of a quote in a text file and the last word of a quote in a text file, and may determine indexed audio times for those words as the starting an ending times of the quote in the audiobook file. At step 128, the one or more servers 104 may extract the audio from the audiobook file beginning at the corresponding time of the first word of a quote and ending at the corresponding time of the last word of a quote or at the corresponding time of the first word after the quote. At step 130, the one or more servers 104 may generate audio files for respective extracted audio quotes (e.g., one audio quote may be one audio file). At step 132, the device 102 may receive a request for book quotes. At step 134, the device 102 may send the request for book quotes to the one or more servers 104. At step 136, the one or more servers 104 may send the audio files with the audio quotes to the device 102 for playback. At step 138, the device 102 may render the audio files with the audio quotes. For example, the device 102 may play a narrator voice saying, "Who said" followed by the received audio representing a narrator's voice imitating a character who said the quote in the audiobook file. In this manner, the audio quotes may be more identifiable than when the quotes are incomplete, include extra words outside of a quote, and are played using a voice which is not representative of a character in a book.

In one or more embodiments, the one or more servers 104 may analyze text files which include the text of electronic books (e.g., step 122). The one or more servers 104 may identify quoted portions of the text files and create audio files (e.g., step 124, step 126, step 128) which, when executed, play a voice representation of the quotes from the books (e.g., step 138). An application may be executed by the device 102 and may allow users to select a book, an author, a series, or a narrator at step 120, and the device 102 may present the audio files (e.g., at step 138).

In one or more embodiments, to identify quotes in text files, the one or more servers 104 may identify sets of quotation marks including a starting quotation mark and an ending quotation mark (e.g., step 122). The one or more servers 104 may maintain or access an index of a location of any letter or word in a text file and the numerical location of the respective letter or word. The one or more servers 104 may identify a starting quotation mark (e.g., a single ' or a double "), and may find the corresponding ending quotation mark (e.g., a single ' or a double "). The one or more servers 104 may identify the text in between the starting quotation mark and the ending quotation mark to determine a quote. For example, the one or more servers 104 may identify a quote by identifying the first character in a text subsequent to a starting quotation mark and identifying the last character in the text prior to the ending quotation mark.

In one or more embodiments, to determine which character in a text said a quote, the one or more servers 104 may identify verbs near an identified quote, and may determine whether any nearby verbs are associated with speech or another form of communication. For example, the one or more servers 104 may have access to a list of words associated with communication (e.g., speech or another form of communication). The one or more servers 104 may search for a matching communication verb within a threshold number of spaces or words from a quote. The one or more servers 104 may identify a communication verb and may determine if the verb is within a number of spaces or words from a quotation mark or a word within an identified quote. When the one or more servers 104 identifies a communication verb within a threshold distance from the quote and not within the quote itself, the one or more servers 104 may determine that the quote was said or otherwise communicated by a character.

In one or more embodiments, to determine which character of a text said a quote, the one or more servers 104 may search for character names, nouns, or pronouns within a threshold number of words or spaces from an identified communication verb. The one or more servers 104 may identify a string of letters beginning with a capital letter and matching a known character name or nickname of the text. When the one or more servers 104 identifies a character name or nickname within a threshold distance from the communication verb, the one or more servers 104 may attribute the quote to the character (e.g., determine that the character said the quote). When the one or more servers 104 is unable to identify a character name within a threshold distance from the communication verb, the one or more servers 104 may identify a noun or pronoun which may refer to a character in the text or an alias of a character. For example, if the one or more servers 104 identifies the words "he yelled" in a text, the one or more servers 104 may identify "yelled" as a communication verb, and may identify "he" as a pronoun within a threshold distance from the verb "yelled." However, the pronoun "he" may be more proximal to the verb than any character name, and the one or more servers 104 may need to determine which character to whom the pronoun "he" refers. The one or more servers 104 may identify the same pronoun or noun within a threshold number of spaces or words of the pronoun, or may identify the same noun or pronoun which is nearest to the noun or pronoun, and may continue to search within a threshold number of spaces or words for a character name or the same noun or pronoun until the device identifies the proximity of a character name to the noun or pronoun. The one or more servers 104 may identify certain text, such as punctuation, which may help the device identify a character to whom to attribute a quote. For example, the one or more servers 104 may identify a comma after the words in a quoted portion, which may indicate a transition from the quote to a mention of the character who said the quote.

In one or more embodiments, to generate an audio file with audio of a quote from a text, the one or more servers 104 may use an audio representation of the text file for a book (e.g., step 124). For example, books may have audiobooks in which one or more narrators read the text and use character voices or different voice deliveries for different characters to present quotes from a book. The character voices, emphasis, and voice inflections from an audiobook may provide a more identifiable representation of an audio quote than an automated default voice which renders a text-to-speech output (e.g., a voice which sounds the same for any audio output generated from a text-to-speech conversion). The one or more servers 104 may identify the times at which words in a text file are spoken in an audiobook file at step 126. For example, the location of characters or words in a text file may be indexed with a corresponding time when the characters or words are spoken in an audiobook file. The one or more servers 104 may identify the starting and ending times of a quote in an audiobook file by determining the corresponding times when the first word after a starting quotation in the text file is spoken and when the last word before an ending quotation in the text file is spoken. The one or more servers 104 may identify the timing when the last word prior to a starting quotation mark is spoken in an audiobook file, and when the first word subsequent to an ending quotation mark is spoken in an audiobook file, and may extract the audio corresponding to the quote without including any audio before or after a quoted portion (e.g., at step 128). If a quote is too short (e.g., if the number of words fails to exceed a threshold number of words or if the duration of the corresponding audio of the quote fails to exceed a time threshold), the one or more servers 104 may combine the quote with another nearby quote said by the same character if the one or more servers 104 identifies such a nearby quote. The one or more servers 104 may create an audio file for any extracted portion or portions of the audiobook file corresponding to a quote in the text file at step 130.

In one or more embodiments, the one or more servers 104 automatically may curate audio quotes to determine suitable audio quotes for use in an application. The one or more servers 104 may convert extracted audio to text using an audio-to-text method. The one or more servers 104 may generate a text file with the converted audio-to-text, and may compare the text file to the identified and corresponding quote from the text file. When the text file and the quote do not match exactly, the one or more servers 104 may discard the audio file. When the text file and the quote match exactly, the one or more servers 104 may determine that the audio file with a quote is available for use at the device 102 by an application.

In one or more embodiments, the one or more servers 104 may maintain available audio files for quotes of one or more books. The one or more servers 104 may assign an identifier to a book, series, author, or narrator, and any audio file associated with the book, series, author, or narrator may be indexed with the identifier. When a user requests audio quotes from a book, series, author, or narrator (e.g., at step 120), the one or more servers 104 may determine the identifier associated with the book, series, author, or narrator, and may identify and send any audio quote files for the book, series, author, or narrator to be rendered.

In one or more embodiments, the one or more servers 104 may determine which quotes are eligible for use by an application. For example, if at step 120 a user provides a verbal command such as "Play quotes from Book X," the one or more servers 104 may identify quotes from Book X and may provide any of the quotes for playback. The one or more servers 104 may prevent the reuse of a quote or quotes from a particular character by maintaining a count of how many times the quote has been used in a time period or use of the application, or a count of how many quotes attributed to one character have been used in a time period or use of the application. If a use count for a quote or character does not exceed a threshold number of uses, the one or more servers 104 may select and provide a quote for playback (e.g., at step 136). The one or more servers 104 may determine whether user answers identifying the character attributed to the quote are correct or incorrect (e.g., in response to step 138). If a quote receives too many incorrect answers (e.g., the incorrect answers exceed a threshold number), the one or more servers 104 may categorize the quote as difficult to identify. The one or more servers 104 may maintain a record of easier and more difficult quotes, and may provide quotes based on factors such as a quote length (e.g., a longer quote may be easier to identify), a character to whom the quote is attributed (e.g., characters with more quotes may be easier to identify), and/or difficulty levels input by a user or determined automatically by the one or more servers 104 based on the accuracy of answers provided by one or more users identifying the characters who said the quotes.

Figure 2:
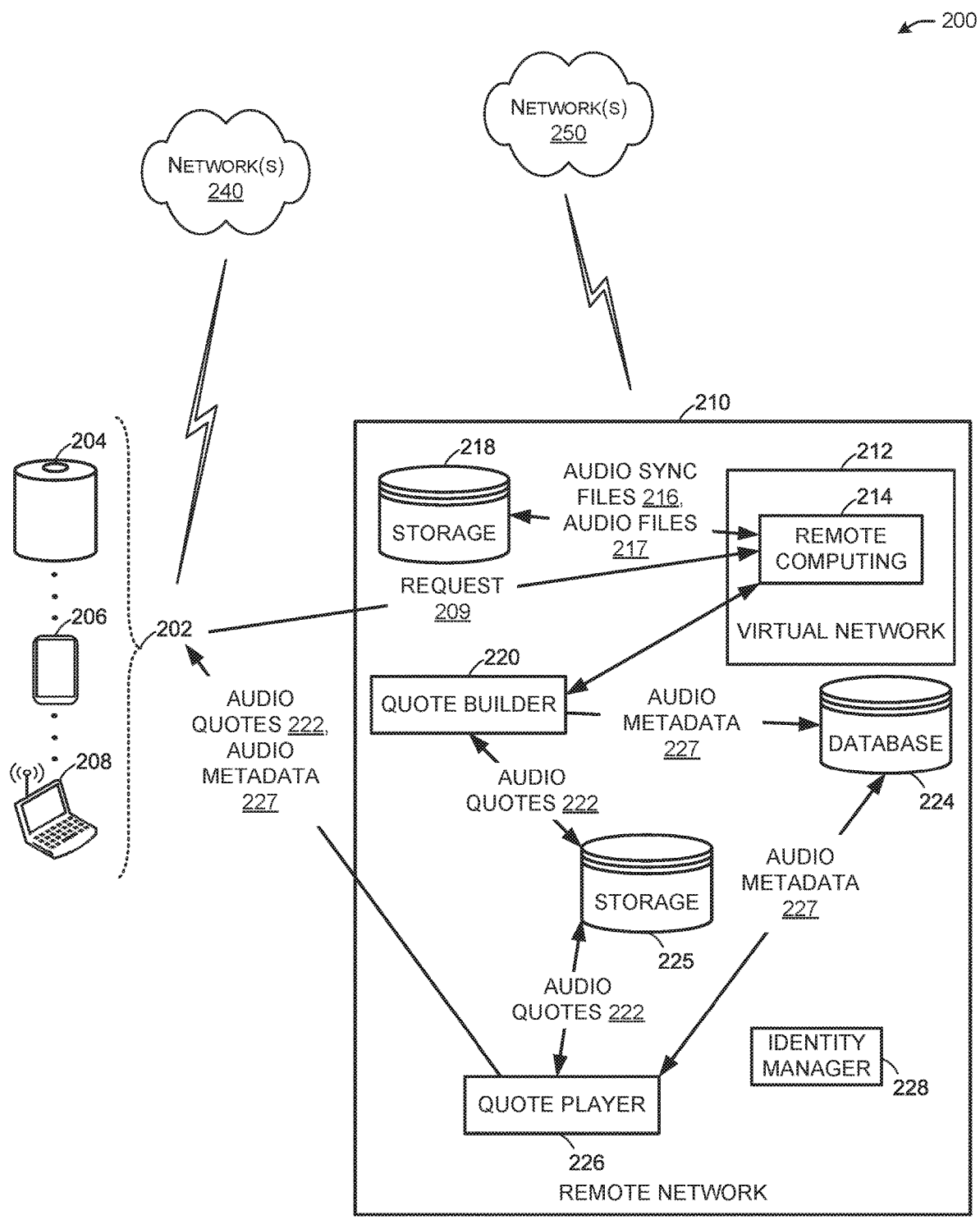
FIG. 2 illustrates a system for generating audio files, in accordance with one or more example embodiments of the present disclosure.

FIG. 2 illustrates a system 200 for generating audio files, in accordance with one or more example embodiments of the present disclosure.

Referring to FIG. 2, the system 200 may include one or more devices 202 (e.g., device 204, device 206, device 208) which may access a remote network 210 for the generation of audio files (e.g., by sending one or more requests 209 for audio). The remote network 210 may include a virtual network 212, which may use one or more networking layers dedicated to one or more accounts for the remote network 210. For example, the virtual network 212 may refer to a virtual private cloud, which may allow the one or more devices 202 to provision a logically isolated portion of the remote network 210 for executing cloud-based resources such as databases, elastic computing resources, queue service resources, notification service resources, elastic container resources, serverless computing resources, and other types of computer resources hosted by a remote network 210. The virtual network 212 may be limited to a range of Internet protocol (IP) addresses, subnetworks, and security groups, and users may configure routing tables for the virtual network 212. The virtual network 212 may include remote computing 214, which may provide remote computing capacity to the one or more devices 202.

Still referring to FIG. 2, the one or more devices 202 may access the remote computing 214 to retrieve audio sync files 216 and audio files 217 from a storage 218 in the remote network 210. The audio files 217 may include respective audio representations (e.g., narrator-read versions of book text) of books. The audio sync files 216 may include information such as the timing of words, spaces, punctuation and quotation marks in the audio files 217. For example, the audio sync files 216 may indicate that a word or quotation mark is audibly represented in an audio file at a particular time. A quote builder 220 (e.g., a serverless computer) in the remote network 210 may parse text files (e.g., including text of respective books, not shown), may identify quotes in the text files, may use the audio sync files 216 to extract audio quotes 222 (e.g., step 126 of FIG. 1) from the audio files 217, may determine audio quote metadata 227, may write the audio quotes 222 to a storage 225 in the remote network 210, and may store the audio metadata 227 in a database 224 in the remote network 210. When the one or more devices 202 receives an input corresponding to a command to retrieve audio (e.g., a voice command to play quotes from a book), a quote player 226 (e.g., a serverless computer) in the remote network 210 may retrieve the audio quotes 222 from the storage 225 and the audio metadata 227 from the database 224 (e.g., an identifier associated with the book from which the quote was generated, an identifier of a character attributed to saying the quote, an indication of how many times a quote has been played, an indication of a difficulty level associated with identifying the character who said the quote, and other information). The quote player 226 may provide the audio quotes 222 and the audio metadata 227 to the one or more user devices 202 for use in an application (e.g., an application whose execution causes output of the audio quotes 222 as part of a game). An identity manager 228 (e.g., a resource manager) may monitor requests made by the one or more devices 202 for the audio quotes 222 and other resources available using the remote network 210 and may determine when the one or more devices 202 has access to the resources (e.g., by verifying accounts associated with the one or more devices 202). When the identity manager 228 verifies that an account of the one or more devices 202 is authorized to receive the audio quotes 222, the one or more devices 202 may receive the audio quotes 222 (e.g., audio files with voice representations of quotes from text files) from the remote network 210 (e.g., step 136 of FIG. 1) and may play the audio quotes 222 (e.g., step 138 of FIG. 1).

In one or more embodiments, the quote builder 220 may analyze the audio sync files 216. The quote builder 220 may identify quoted portions of the audio sync files 216 and create the audio quotes 222 which, when executed, play a voice representation of quotes from books. An application may be executed by the one or more devices 202 and may allow users to select a book, an author, a series, or a narrator, and the one or more devices 202 may present the audio quotes 222 (e.g., at step 138 of FIG. 1).

In one or more embodiments, to identify quotes in text files, the quote builder 220 may identify sets of quotation marks including a starting quotation mark and an ending quotation mark (e.g., step 122 of FIG. 1). The quote builder 220 may maintain or access an index of a location of any letter or word in a text file and the numerical location of the respective letter or word. The quote builder 220 may identify a starting quotation mark (e.g., a single ' or a double "), and may find the corresponding ending quotation mark (e.g., a single ' or a double "). The quote builder 220 may identify the text in between the starting quotation mark and the ending quotation mark to determine a quote. For example, the quote builder 220 may identify a quote by identifying the first character in a text subsequent to a starting quotation mark and identifying the last character in the text prior to the ending quotation mark.

In one or more embodiments, to determine which character in a text said a quote, the quote builder 220 may identify verbs near an identified quote, and may determine whether any nearby verbs are associated with speech or another form of communication. For example, the quote builder 220 may have access to a list of words associated with communication (e.g., speech or another form of communication). The quote builder 220 may search for a matching communication verb within a threshold number of spaces or words from a quote. The quote builder 220 may identify a communication verb and may determine if the verb is within a number of spaces or words from a quotation mark or a word within an identified quote. When the quote builder 220 identifies a communication verb within a threshold distance from the quote and not within the quote itself, the quote builder 220 may determine that the quote was said or otherwise communicated by a character.

In one or more embodiments, to determine which character of a text said a quote, the quote builder 220 may search for character names, nouns, or pronouns within a threshold number of words or spaces from an identified communication verb. The quote builder 220 may identify a string of letters beginning with a capital letter and matching a known character name or nickname of the text. When the quote builder 220 identifies a character name or nickname within a threshold distance from the communication verb, the quote builder 220 may attribute the quote to the character (e.g., determine that the character said the quote). When the quote builder 220 is unable to identify a character name within a threshold distance from the communication verb, the quote builder 220 may identify a noun or pronoun which may refer to a character in the text. For example, if the quote builder 220 identifies the words "she declared" in a text, the quote builder 220 may identify "declared" as a communication verb, and may identify "she" as a pronoun within a threshold distance from the verb "declared." However, the pronoun "she" may be more proximal to the verb than any character name, and the quote builder 220 may need to determine which character to whom the pronoun "she" refers. The quote builder 220 may identify the same pronoun or noun within a threshold number of spaces or words of the pronoun, or may identify the same noun or pronoun which is nearest to the noun or pronoun, and may continue to search within a threshold number of spaces or words for a character name or the same noun or pronoun until the device identifies the proximity of a character name to the noun or pronoun. The quote builder 220 may identify certain text, such as punctuation, which may help the device identify a character to whom to attribute a quote. For example, the quote builder 220 may identify a comma after the words in a quoted portion, which may indicate a transition from the quote to a mention of the character who said the quote.

In one or more embodiments, to generate an audio file with audio of a quote from a text, the quote builder 220 may use an audio representation of the text file for a book. For example, books may have audiobooks in which one or more narrators read the text and use character voices to deliver quotes from a book. The character voices, emphasis, and voice inflections from an audiobook may provide a more identifiable representation of an audio quote than an automated default voice which renders a text-to-speech output (e.g., a voice which sounds the same for any audio output generated from a text-to-speech conversion). The quote builder 220 may identify the times at which words in a text file are spoken in the audiobook file. For example, the location of characters or words in a text file may be indexed with a corresponding time when the characters or words are spoken in an audiobook file. The quote builder 220 may identify the starting and ending times of a quote in an audiobook file by determining the corresponding times when the first word after a starting quotation in the text file is spoken and when the last word before an ending quotation in the text file is spoken. The quote builder 220 may identify the timing when the last word prior to a starting quotation mark is spoken in an audiobook file, and when the first word subsequent to an ending quotation mark is spoken in an audiobook file, and may extract the audio corresponding to the quote without including any audio before or after a quoted portion. The quote builder 220 may use timing offsets included in the audio sync files 216 (e.g., indicating corresponding times when words of a text file are audibly represented in the audio files 217) to identify a beginning time and an ending time to extract audio from the audio files 217 in generating the audio quotes 222. If a quote is too short (e.g., if the number of words fails to exceed a threshold number of words or if the duration of the corresponding audio of the quote fails to exceed a time threshold), the quote builder 220 may combine the quote with another nearby quote said by the same character when the quote builder 220 identifies such a nearby quote. The quote builder 220 may create the audio quotes 222 file for any extracted portion or portions of the audiobook file corresponding to a quote in a text file.

In one or more embodiments, the remote network 210 automatically may curate audio quotes to determine suitable audio quotes for use in an application by the one or more devices 202. The remote network 210 may convert extracted audio to text using an audio-to-text method. The remote network 210 may generate a text file with the converted audio-to-text, and may compare the text file to the identified and corresponding quote from the text file. When the text file and the quote do not match exactly, the remote network 210 may discard the audio file. When the text file and the quote match exactly, the remote network 210 may determine that the audio file associated with the audio quotes 222 is available for use at the one or more devices 202 by an application.

In one or more embodiments, the database 224 may maintain available audio files (e.g., the audio quotes 222) for quotes of one or more books. The remote network 210 may assign an identifier to a book, series, author, or narrator, and any audio file associated with the book, series, author, or narrator may be indexed with the identifier. When a user requests audio quotes from a book, series, author, or narrator, the remote network 210 may determine the identifier associated with the book, series, author, or narrator, and may identify and send any audio quote files for the book, series, author, or narrator to be rendered.

In one or more embodiments, the remote network 210 may determine which quotes are eligible for use by an application. For example, if the one or more user devices 202 receives a verbal command such as "Play quotes from Book X," the remote network 210 may, using the quote player 226, identify quotes in the database 224 from Book X and may provide any of the quotes for playback.

In one or more embodiments, the one or more devices 202 may include a personal computer (PC), a smart home device, a device with one or more speakers or other audio outputs, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

The one or more devices 202 may be configured to communicate via a communications network 240, and the remote network 210 may be configured to communicate via a wireless communications network 250, wirelessly or wired. The communications network 240 and/or the communications network 250 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 240 and/or the communications network 250 may have any suitable communication range associated therewith and may include, for example, global networks (e.g., the Internet), metropolitan area networks (MANs), wide area networks (WANs), local area networks (LANs), or personal area networks (PANs). In addition, communications network 240 and/or the communications network 250 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The one or more devices 202 and/or the remote network 210 may include one or more communications antennas. The one or more communications antennas may be any suitable type of antennas corresponding to the communications protocols used by the one or more devices 202 and/or the remote network 210. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The one or more communications antennas may be communicatively coupled to a radio component to transmit and/or receive signals, such as communications signals to and/or from the one or more devices 202 and/or the remote network 210.

The one or more devices 202 and/or the remote network 210 may include any suitable radio and/or transceiver for transmitting and/or receiving radio frequency (RF) signals in the bandwidth and/or channels corresponding to the communications protocols utilized by any of the one or more devices 202 and/or the remote network 210 to communicate with each other. The radio components may include hardware and/or software to modulate and/or demodulate communications signals according to pre-established transmission protocols. The radio components may further have hardware and/or software instructions to communicate via one or more cellular protocols, Wi-Fi and/or Wi-Fi direct protocols, as standardized by the Institute of Electrical and Electronics Engineers (IEEE) 802.11 standards, or other communication protocols.

The one or more devices 202 may receive voice commands, remote control commands, manual inputs, gestures, and other types of commands from users or other devices. The one or more devices 202 may translate commands into actions such as playing content. When the one or more devices 202 receives a voice command, the one or more devices 202 may send the voice command to the remote network 210 for translation into actions. If the command is associated with playing audio such as quotes from a book, the one or more devices 202 may send the command to the remote network 210, may receive audio files with quotes (e.g., the audio quotes 222) from the remote network 210, and may play the audio along with other narration or instructions. For example, the one or more devices 202 may facilitate the playing of a game in which a device (e.g., the device 204) plays audio asking which character from a book or series said a quote, and may play the audio of the quote. The device 202 may receive an input with an answer regarding which character said a quote, and may send the answer to the remote network 210, which may determine whether the answer is correct or not. The remote network 210 may provide indications to the one or more devices 202 regarding whether an answer was correct, and may keep scores indicative of correct or incorrect answers. The remote network 210 may receive indications that a quote was not attributed to the correct character, and may search for another character name nearby a communication verb to consider as a candidate character to whom to attribute an identified quote.

The remote network 210 may include one or more servers (e.g., the one or more servers 104 of FIG. 1) which may facilitate the performance of the remote computing 214, the quote builder 220, the quote player 226, and the identity manager 228.

Figure 3:
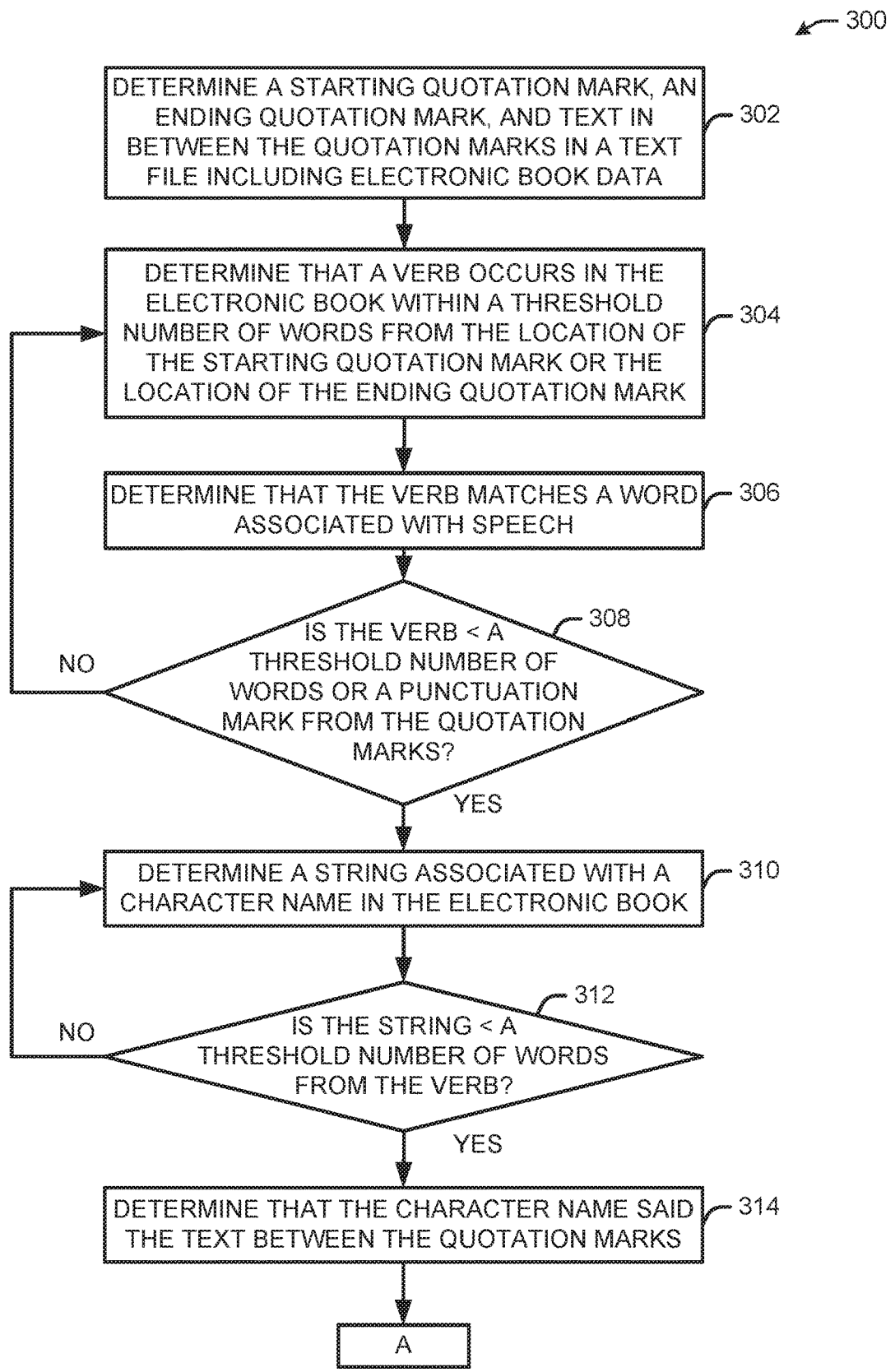
FIG. 3 illustrates a flow diagram for a process for generating audio files, in accordance with one or more example embodiments of the present disclosure.

FIG. 3 illustrates a flow diagram for a process 300 for generating audio files, in accordance with one or more example embodiments of the present disclosure.

At block 302, a device (e.g., the one or more servers 104 of FIG. 1, the quote builder 220 of FIG. 2) may determine a starting quotation mark, and ending quotation mark (e.g., a set of quotation marks), and text in between the starting and ending quotation marks from within a text file including text of an electronic book. The device may analyze text files (e.g., the audio sync files 216 of FIG. 2) which may include the timing offsets when the text of electronic books are audibly represented in an audiobook (e.g., the audio files 217 of FIG. 2). The device may identify quoted portions of the text files and create audio files which, when executed, play a voice representation of the quotes from the books (e.g., at the one or more devices 202 of FIG. 2). An application may be executed by a device (e.g., the device 204 of FIG. 2) and may allow users to select a book, an author, a series, or a narrator, and the device may present the audio files to the users, who may provide inputs indicating their answers regarding which characters said a quote played by an audio file. The device may maintain an index of a location of any letter or word in a text file (e.g., the audio sync files 216 of FIG. 2) and the numerical location of the respective letter or word. For example, the device may identify a quote by identifying the first character in a text subsequent to a starting quotation mark and identifying the last character in the text prior to the ending quotation mark. In this manner, the device may ensure that all characters (e.g., letters or numbers) within a set of quotation marks are included in a quote, and that no characters or words outside of the quotation marks are included in a quote. Quotation marks may include single or double quotation marks, curly quotation marks, straight quotation marks, or any other type of quotation mark.

At block 304, the device may determine that a verb occurs in the electronic book within a threshold number of words or spaces from the location of the starting or ending quotation mark. The device may identify verbs near an identified quote, and at block 306 may determine whether any nearby verbs are associated with speech or another form of communication. For example, the device may have access to a list of words associated with communication, such as "said, agreed, muttered, shouted, whispered, yelled," and "cried."

At block 308, the device may determine whether the verb is less than a threshold number of words or spaces from the starting or ending quotation mark. For example, the device may search for a matching communication verb within a threshold number of spaces or words from a quote. The threshold may refer to a number of pages, paragraphs, or a same section or chapter. The verb may be the most proximal verb (e.g., to the quotation marks) matching a list of verbs associated with speaking or any form of communication. The device may identify a communication verb and may determine if the verb is within a number of spaces or words from a quotation mark or a word within an identified quote. The device may determine that the verb is not included in the quote. When the device identifies a communication verb within a threshold distance from the quote and not within the quote itself, the device may determine that the quote was said or otherwise communicated by a character. When the device determines that the communication verb is within a threshold distance from the starting or ending quotation mark, the process 300 may continue at block 310. Otherwise, the process 300 may return to block 304 to identify another communication verb. The device may determine if the verb is near any punctuation marks. For example, the device may determine whether the verb is beyond a period or comma subsequent to quoted text. If the verb is beyond a punctuation mark such as a period or comma near the quoted text, the process 300 may return to block 304. Otherwise, the process 300 may continue to block 310. There may be multiple speaking verbs within a threshold distance of starting or ending quotation marks. The device may determine which of multiple speaking verbs within a threshold distance of either a starting or ending quotation mark is closer to either the starting or ending quotation mark (e.g., which candidate verb is closer to a same starting or ending quotation mark, or which candidate verb is closer to either a starting or ending quotation mark associated with a quote). The device may determine that the closest speaking verb to a quotation mark is the verb most likely associated with the quote.

At block 310, the device may determine a string associated with a character name in the electronic book. For example, the device may search for character names, nouns, or pronouns within a threshold number of words or spaces from an identified communication verb. The device may identify a string of letters beginning with a capital letter and matching a known character name or nickname of the text. When multiple character names are identified by the device, the device may determine which character name is nearer to the communication verb or follows text patterns more likely to be associated with a quote (e.g., a communication verb followed by a quote and separated by punctuation such as a comma, a quote followed by a comma and then a nearby communication verb, or other patterns).

At block 312, the device may determine whether the string beginning with a capital letter is within a threshold number of words or spaces from the communication verb. When the device identifies a character name or nickname within a threshold distance from the communication verb, the device may attribute the quote to the character (e.g., determine that the character said the quote). When the device is unable to identify a character name within a threshold distance from the communication verb, the device may identify a noun or pronoun which may refer to a character in the text. For example, if the device identifies the words "she said" in a text, the device may identify "said" as a communication verb, and may identify "she" as a pronoun within a threshold distance from the verb "said." However, the pronoun "she" may be more proximal to the verb than any character name, and the device may need to determine which character to whom the pronoun "she" refers. The device may identify the same pronoun or noun within a threshold number of spaces or words of the pronoun, or may identify the same noun or pronoun which is nearest to the noun or pronoun, and may continue to search within a threshold number of spaces or words for a character name or the same noun or pronoun until the device identifies the proximity of a character name to the noun or pronoun. The device may identify certain text, such as punctuation, which may help the device identify a character to whom to attribute a quote. For example, the device may identify a comma after the words in a quoted portion, which may indicate a transition from the quote to a mention of the character who said the quote. When the device determines that the string is within a threshold distance from the communication verb, the process 300 may continue at block 314. Otherwise, the process 300 may return to block 310 to identify another string associated with a character name, which may represent another candidate character to whom to attribute the quote.

At block 314, the device may determine that the character name or nickname said the text in between the starting and ending quotation marks (e.g., the quote). To determine that a character name or nickname said a quote may include attributing the quote to a character in the electronic book. The device may index the quote with an identifier of the book and an indication of the character to whom the quote has been attributed. The process 300 may continue to block A.

Figure 4:
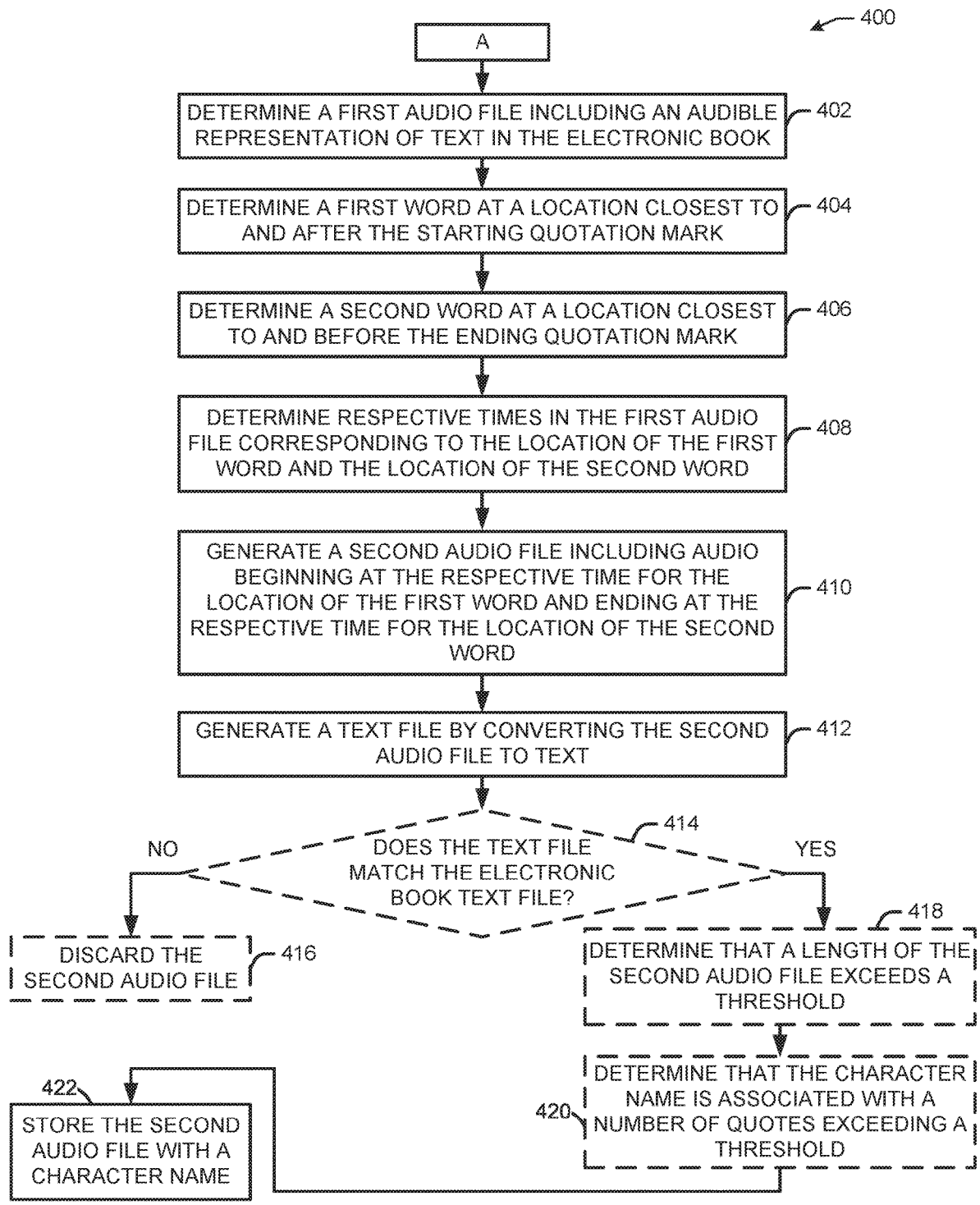
FIG. 4 illustrates a flow diagram for a process for generating audio files, in accordance with one or more example embodiments of the present disclosure.

FIG. 4 illustrates a flow diagram for a process 400 for generating audio files, in accordance with one or more example embodiments of the present disclosure.

The process 400 may begin at block A (e.g., after block 314 of FIG. 3), and may continue to block 402. At block 402, a device (e.g., the one or more servers 104 of FIG. 1, the quote builder 220 of FIG. 2) may determine a first audio file (e.g., from among the audio sync files 216 of FIG. 2) including an audio representation of text in the electronic book. For example, books may have audiobooks in which one or more narrators read the text and use character voices to deliver quotes from a book. The character voices, emphasis, and voice inflections from an audiobook may provide a more identifiable representation of an audio quote than an automated default voice which renders a text-to-speech output (e.g., a voice which sounds the same for any audio output generated from a text-to-speech conversion).

At block 404, the device may determine a first word in the text of the electronic book closest to and after the starting quotation mark (e.g., the first word following the starting quotation mark in a set of quotation marks). The device may have access to indexed locations corresponding to words, letters, punctuation, or other characters in the electronic book, and may look at the location or word closest to and subsequent to the starting quotation mark. At block 406, the device may determine a second word at a location closest to and before the ending quotation mark in a set of quotation marks. The device may have access to indexed locations corresponding to words, letters, punctuation, or other characters in the electronic book, and may look at the location or word closest to and prior to the ending quotation mark. The first word may be the first word of the text in between the quotation marks (e.g., the quoted portion), and the second word may be the final word of the text in between the quotation marks. Knowing the respective locations within the electronic book representing the beginning and ending locations of a quote, the device may determine corresponding audio for a quote.

At block 408, the device may determine respective times in the first audio file corresponding to the location of the first word and the second word in the text file. The device may have access to indexed locations of words in the electronic book and their corresponding playback times of an audiobook file which includes audio output of the words of the electronic book (e.g., as narrated by one or more narrators). The device may map the location of the first word of a quote to the time when the first word is spoken in the audio file, and may map the location of the final word of the quote to the time when the final word is spoken in the audio file. The device may determine the time when the next word subsequent to the ending quotation mark is spoken in the audio file and may determine that the audio quote ends just before such time.

At block 410, the device may generate a second audio file including audio from the first audio file beginning at a time corresponding to the first word of the quote and ending at the time corresponding to the last word of the quote or just before the time of the first word following the ending quotation mark. The device may use a file (e.g., the audio sync files 216 of FIG. 2) to identify offset times when words (e.g., corresponding to words of a book) are audibly represented in first audio file (e.g., the audio files 217 of FIG. 2). The offset times may indicate the beginning and ending times of respective words. For example, the offset times may indicate a time when a first word (e.g., the first word of a quote) may begin to be audibly represented in the first audio file and a time when a second word (e.g., the final word of a quote) may complete audio representation in the first audio file. The offset times may be used to determine the beginning and ending times of a quote in the first audio file. The device may extract the audio from the beginning time to the ending time from the first audio file to generate an audio clip representative of the quote. The device may generate respective audio files for any respective quotes in a book. The device may determine an identifier for the generated audio file to identify the book from which the audio quote was generated, and the device may determine an identifier of a character to whom the quote was attributed. The device may store the generated audio file along with identifying data of the book and the character.

At block 412, the device may generate a text file by converting the second audio file to text. For example, the device may convert audio from analog to digital format and may divide the audio file into segments. The device may match the audio in the segments to phonemes, and may combine phonemes to identify sounds and corresponding words. The device may generate a text file with the converted audio-to-text, and may compare the text file to the identified and corresponding quote from the text file.

At block 414, the device may determine whether the generated text file matches the text file of the electronic book. In particular, the device may determine whether the text generated from the audio file matches the quoted portion from the electronic book from which the audio file was generated. When the text file and the quote do not match exactly, the device may discard the audio file at block 416. When the text file and the quote match exactly, the device may proceed to block 418.

At block 418, the device may determine that the audio file is long enough to use by an application. For example, the device may determine that the audio file exceeds a threshold length of time, indicating that the audio clip is long enough for a user to be able to identify the quote and attribute the quote to a character. If the audio file is too short (e.g., in time or with regard to a number of words), the device may discard the audio file or combine the audio file with another audio file (e.g., another audio file whose length is less than a threshold length). The threshold length may be set by a user, or automatically set and/or adjusted based on the device's determination of a user's skill level.

At block 420, the device may determine that the character name to whom the quote was attributed (e.g., at block 314 of FIG. 3) is associated with a number of quotes exceeding a threshold number of quotes. For example, the device may select quotes from characters who have enough quotes in a book to be identifiable, so the device may set a threshold number of quotes (e.g., preset or determined based on a user's skill level) to be associated with a character name in order for a quote attributed to the character name to be selected. The device may identify all audio files of quotes associated with a character from a book or series, and may determine whether the number of audio files for the character name exceeds the threshold number of quotes. If not, the device may avoid selecting quotes from the character name, or may prioritize the delivery of quotes based on how many quotes are attributed to a character. The device may increment a counter for an audio file when the audio file is used, and may maintain a record of the count for a respective audio file. The device may limit selection of quotes from a character in a book to a certain number within a given time period or use of an application (e.g., to avoid playing too many quotes by the same character, resulting in a high percentage of quote identification answers being for the same character). At block 422, when the device determines that a quote is eligible for use, the device may store and/or send the second audio file (e.g., to a device for playback). The second audio file may be stored with an indication of the character to whom the quote of the second audio file is attributed and with one or more identifiers associated with an application (e.g., a game), a book, an author, a narrator, or another identifier which may identify one or more audio files of a book.

Figure 5:
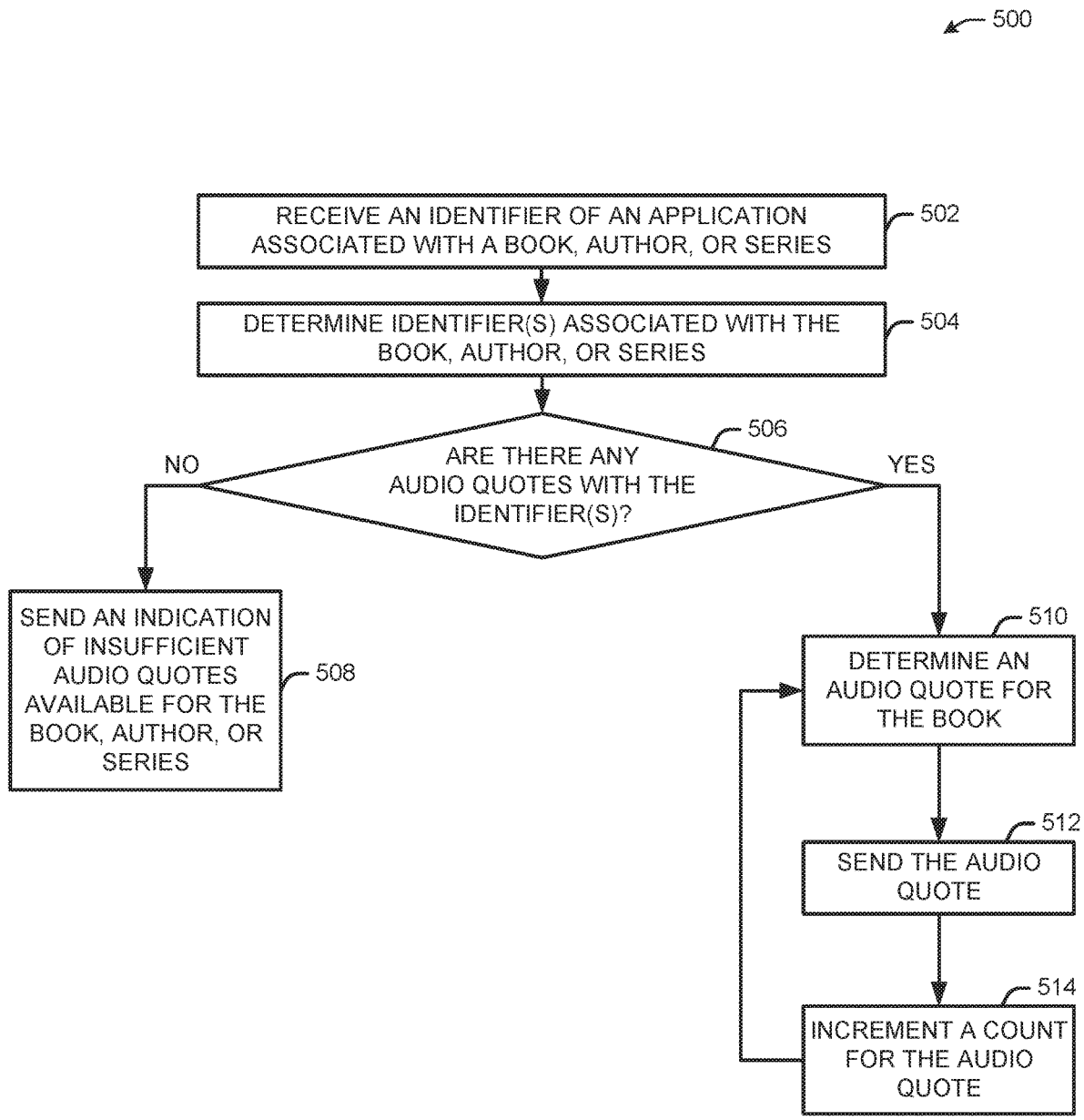
FIG. 5 illustrates a flow diagram for a process for generating audio files, in accordance with one or more example embodiments of the present disclosure.

FIG. 5 illustrates a flow diagram for a process 500 for generating audio files, in accordance with one or more example embodiments of the present disclosure.

At block 502, a device (e.g., the one or more servers 104 of FIG. 1, the quote builder 220 of FIG. 2) may receive an identifier of an application associated with a book, author, series, or narrator of an audiobook. The identifier may be received from another device (e.g., the device 102 of FIG. 1, the one or more user devices 202 of FIG. 2). For example, the identifier may be included in a voice command received by the other device, such as "Play quotes from Book X," "Quiz me on Series Y," or other examples of requests to receive audio quotes including narrated quotes attributed to characters in a book. The request may be received with the identifier of the application used to play the audio quotes. The application may use audio files with audio quotes from one or more books. Audio files with audio quotes from books may be stored with the identifier.

At block 504, the device may determine one or more identifiers associated with the book, author, series, or narrator. For example, a user may not be aware of which books have audio quotes available for playback in an application (e.g., a game which asks users to identify the character who delivered a quote in a book). When a user creates an application using the device, the device may generate an identifier for the application. When a request or selection of an author, series, or narrator of an audiobook is received, the device may assign the identifier of the application with any audio file with an audio quote attributed to a character in a book written by the author, included in the series, or narrated by the narrator. For example, the device may store the audio files along with identifiers for the book, author, series, or narrator in a database (e.g., database 224 of FIG. 2), and may retrieve and deliver audio files with the audio quotes corresponding to received identifiers.

At block 506, the device may determine whether there are any audio quotes with the identifiers of a book, author, series, or narrator. The device may match the identifiers with corresponding audio files. When there are no audio quotes for a particular book, author, series, or narrator, or when the number of quotes matching an identifier for a book, author, series, or narrator is less than a threshold number of audio quotes, the device may proceed to block 508 where the device may send an indication that the number of available audio quotes for the book, author, series, or narrator is insufficient. When the number of quotes exceeds a threshold number of quotes, the device may proceed to block 510.

At block 510, the device may determine an audio quote for the book, author, series, or narrator. For example, the device may determine a quote which satisfies selection criteria such as whether the audio file exceeds a length threshold, whether the number of words in the audio file exceeds a threshold number of words, whether the number of times the audio file has been played during a given time or execution of the application is less than a use threshold, or whether the character to whom the quote is attributed is associated with a number of quotes which exceeds a quote threshold. At block 512, the device may select and send an audio quote for playback when the audio quote satisfies selection criteria. At block 514, the device may increment a count for the audio quote for use in monitoring the usage of the quote.

In one or more embodiments, the device may maintain available audio files for quotes of one or more books. The device may assign an identifier to a book, series, author, or narrator, and any audio file associated with the book, series, author, or narrator may be indexed with the identifier. When a user requests audio quotes from a book, series, author, or narrator, the device may determine the identifier associated with the book, series, author, or narrator, and may identify and send any audio quote files for the book, series, author, or narrator to be rendered.

In one or more embodiments, the device may determine which quotes are eligible for use by an application. For example, if a user provides a verbal command such as "Play quotes from Book X," the device may identify quotes from Book X and may provide any of the quotes for playback. However, a user's experience may be enhanced by the device selecting some quotes over other quotes. For example, quotes from characters who are more recognizable (e.g., are attributed to a number of quotes exceeding a threshold number of quotes) may be more identifiable by users than quotes from characters who are not mentioned often in a text or who have a few attributed quotes. The device may prevent the reuse of a quote or quotes from a particular character by maintaining a count of how many times the quote has been used in a time period or use of the application, or a count of how many quotes attributed to one character have been used in a time period or use of the application. If a use count for a quote or character does not exceed a threshold number of uses, the device may select and provide a quote for playback. The device may determine whether user answers identifying the character attributed to the quote are correct or incorrect. If a quote receives too many incorrect answers (e.g., the incorrect answers exceed a threshold number), the device may categorize the quote as difficult to identify. The device may maintain a record of easier and more difficult quotes, and may provide quotes based on difficulty levels input by a user or determined automatically by the device based on the accuracy of answers provided by one or more users identifying the characters who said the quotes.

Referring to FIGS. 3-5, when quotes are identified in text and audio files, the storage and/or selection of quotes for playback may depend on a device's ability to classify a quote. For example, the device may not be able to determine a character name within a threshold number of words from a communication verb associated with a quote. The device may determine a character to whom to attribute to such a quote, but may classify the quote with a confidence score indicating the possibility that a quote may not be attributed to the correct character. The device may assign a score to a quote based on the quote's length, the number of quotes attributed to the character associated with the quote, and the number of correct or incorrect user answers identifying which character from a book said the quote. The device may select quotes with scores exceeding score thresholds, or may select any quotes regardless of the quote scores. The device may facilitate the playback of audio quotes at multiple devices when the devices coordinate execution of an application (e.g., the application may include a game played by multiple users across the one or more devices 202 of FIG. 2). The device may deliver audio quotes to multiple devices at the same time for playback so that users of the devices may compete to determine who provides the most accurate answers and/or who can most quickly identify the correct character to whom a quote is attributed.

Figure 6:
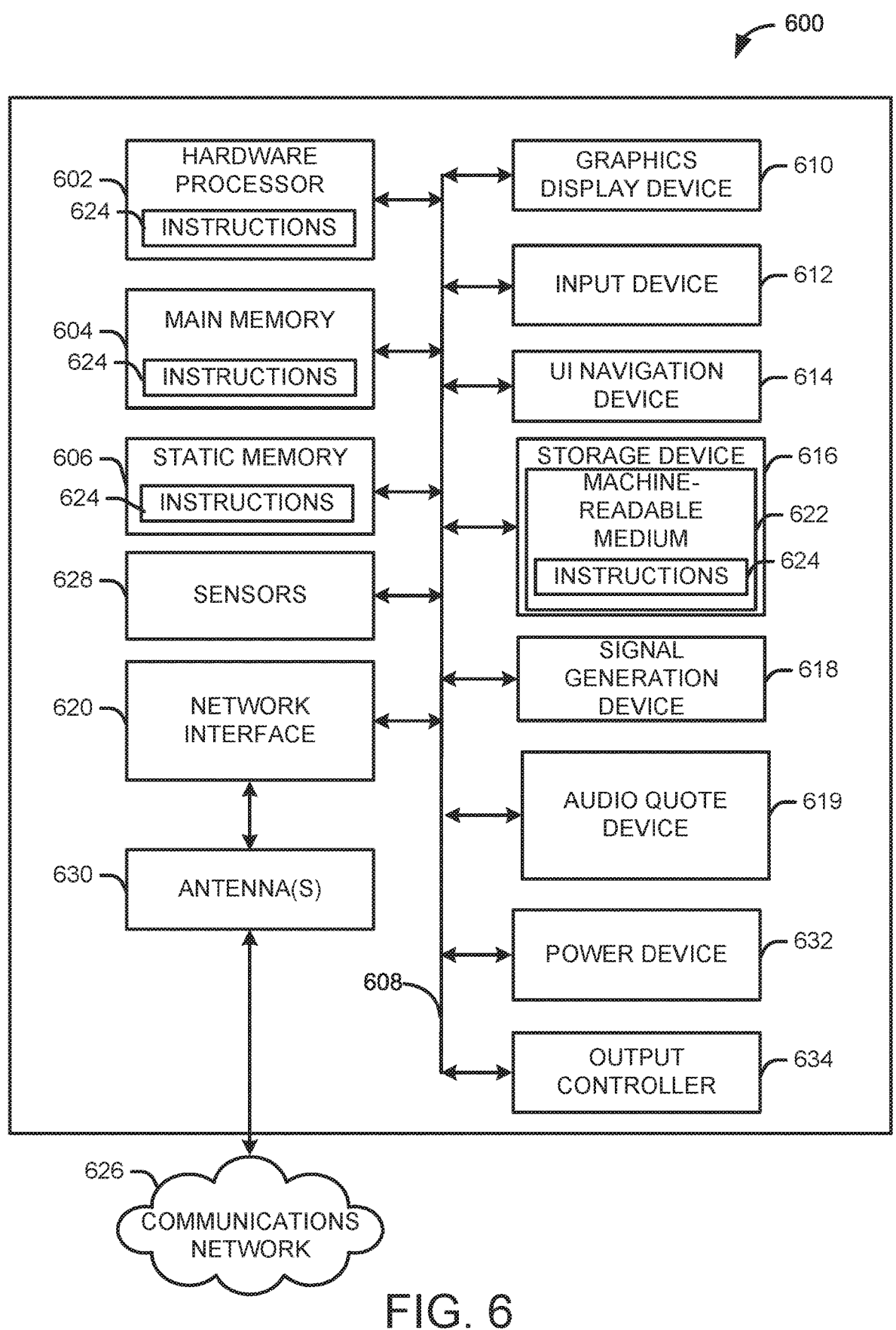
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the device 102 of FIG. 1, the one or more servers 104 of FIG. 1, the one or more devices 202 of FIG. 2, the remote computing 214 of FIG. 2, the quote builder 220 of FIG. 2, the quote player 226 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., an emitter, a speaker), an audio quote device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The audio quote device 619 may carry out or perform any of the operations and processes (e.g., process 300 of FIG. 3, process 400 of FIG. 4, process 500 of FIG. 5) described and shown above.

In one or more embodiments, the audio quote device 619 may be implemented as part of a remote network (e.g., the remote network 210 of FIG. 2). The audio quote device 619 may analyze text files which include the text of electronic books. The audio quote device 619 may identify quoted portions of the text files and create audio files which, when executed, play a voice representation of the quotes from the books. An application may be executed by a device (e.g., the one or more user devices 202 of FIG. 2) and may allow users to select a book, an author, a series, or a narrator, and the device may present the audio files to the users, who may provide inputs indicating their answers regarding which characters said a quote played by an audio file.

In one or more embodiments, to identify quotes in text files, the audio quote device 619 may identify sets of quotation marks including a starting quotation mark and an ending quotation mark. The audio quote device 619 may maintain an index of a location of any letter or word in a text file and the numerical location of the respective letter or word. The audio quote device 619 may identify a starting quotation mark (e.g., a single ' or a double "), and may find the corresponding ending quotation mark (e.g., a single ' or a double "). The audio quote device 619 may identify the text in between the starting quotation mark and the ending quotation mark to determine a quote. For example, the audio quote device 619 may identify a quote by identifying the first character in a text subsequent to a starting quotation mark and identifying the last character in the text prior to the ending quotation mark. In this manner, the audio quote device 619 may ensure that all characters (e.g., letters or numbers) within a set of quotation marks are included in a quote, and that no characters or words outside of the quotation marks are included in a quote.

In one or more embodiments, to determine which character in a text said a quote, the audio quote device 619 may identify verbs near an identified quote, and may determine whether any nearby verbs are associated with speech or another form of communication. For example, the audio quote device 619 may have access to a list of words associated with communication, such as "said, agreed, muttered, shouted, whispered, yelled," and "cried." The audio quote device 619 may search for a matching communication verb within a threshold number of spaces or words from a quote. The audio quote device 619 may identify a communication verb and may determine if the verb is within a number of spaces or words from a quotation mark or a word within an identified quote. The audio quote device 619 may determine that the verb is not included in the quote. When the audio quote device 619 identifies a communication verb within a threshold distance from the quote and not within the quote itself, the audio quote device 619 may determine that the quote was said or otherwise communicated by a character.

In one or more embodiments, to determine which character of a text said a quote, the audio quote device 619 may search for character names, nouns, or pronouns within a threshold number of words or spaces from an identified communication verb. The audio quote device 619 may identify a string of letters beginning with a capital letter and matching a known character name or nickname of the text. When the audio quote device 619 identifies a character name or nickname within a threshold distance from the communication verb, the audio quote device 619 may attribute the quote to the character (e.g., determine that the character said the quote). When the audio quote device 619 is unable to identify a character name within a threshold distance from the communication verb, the device may identify a noun or pronoun which may refer to a character in the text. For example, if the audio quote device 619 identifies the words "she said" in a text, the device may identify "said" as a communication verb, and may identify "she" as a pronoun within a threshold distance from the verb "said." However, the pronoun "she" may be more proximal to the verb than any character name, and the audio quote device 619 may need to determine which character to whom the pronoun "she" refers. The audio quote device 619 may identify the same pronoun or noun within a threshold number of spaces or words of the pronoun, or may identify the same noun or pronoun which is nearest to the noun or pronoun, and may continue to search within a threshold number of spaces or words for a character name or the same noun or pronoun until the audio quote device 619 identifies the proximity of a character name to the noun or pronoun. The audio quote device 619 may identify certain text, such as punctuation, which may help the device identify a character to whom to attribute a quote. For example, the audio quote device 619 may identify a comma after the words in a quoted portion, which may indicate a transition from the quote to a mention of the character who said the quote.

In one or more embodiments, to generate an audio file with audio of a quote from a text, the audio quote device 619 may use an audio representation of the text file for a book. The audio quote device 619 may identify the times at which words in a text file are spoken in an audiobook file. For example, the location of characters or words in a text file may be indexed with a corresponding time when the characters or words are spoken in an audiobook file. The audio quote device 619 may identify the starting and ending times of a quote in an audiobook file by determining the corresponding times when the first word after a starting quotation in the text file is spoken and when the last word before an ending quotation in the text file is spoken. The audio quote device 619 may identify the timing when the last word prior to a starting quotation mark is spoken in an audiobook file, and when the first word subsequent to an ending quotation mark is spoken in an audiobook file, and may extract the audio corresponding to the quote without including any audio before or after a quoted portion. If a quote is too short (e.g., if the number of words fails to exceed a threshold number of words or if the duration of the corresponding audio of the quote fails to exceed a time threshold), the audio quote device 619 may combine the quote with another nearby quote said by the same character if the device identifies such a nearby quote. The audio quote device 619 may create an audio file for any extracted portion or portions of the audiobook file corresponding to a quote in the text file.

In one or more embodiments, the audio quote device 619 automatically may curate audio quotes to determine suitable audio quotes for use in an application. The device may convert extracted audio to text using an audio-to-text method. For example, the audio quote device 619 may convert audio from analog to digital format and may divide the audio file into segments. The audio quote device 619 may match the audio in the segments to phonemes, and may combine phonemes to identify sounds and corresponding words. The audio quote device 619 may generate a text file with the converted audio-to-text, and may compare the text file to the identified and corresponding quote from the text file. When the text file and the quote do not match exactly, the audio quote device 619 may discard the audio file. When the text file and the quote match exactly, the audio quote device 619 may determine that the audio file with a quote is available for use by an application.

In one or more embodiments, the audio quote device 619 may maintain available audio files for quotes of one or more books. The audio quote device 619 may assign an identifier to a book, series, author, or narrator, and any audio file associated with the book, series, author, or narrator may be indexed with the identifier. When a user requests audio quotes from a book, series, author, or narrator, the audio quote device 619 may determine the identifier associated with the book, series, author, or narrator, and may identify and send any audio quote files for the book, series, author, or narrator to be rendered.

In one or more embodiments, the audio quote device 619 may determine which quotes are eligible for use by an application. For example, if a user provides a verbal command such as "Play quotes from Book X," the audio quote device 619 may identify quotes from Book X and may provide any of the quotes for playback. The audio quote device 619 may prevent the reuse of a quote or quotes from a particular character by maintaining a count of how many times the quote has been used in a time period or use of the application, or a count of how many quotes attributed to one character have been used in a time period or use of the application. If a use count for a quote or character does not exceed a threshold number of uses, the audio quote device 619 may select and provide a quote for playback. The audio quote device 619 may determine whether user answers identifying the character attributed to the quote are correct or incorrect. If a quote receives too many incorrect answers (e.g., the incorrect answers exceed a threshold number), the audio quote device 619 may categorize the quote as difficult to identify. The audio quote device 619 may maintain a record of easier and more difficult quotes, and may provide quotes based on difficulty levels input by a user or determined automatically by the audio quote device 619 based on the accuracy of answers provided by one or more users identifying the characters who said the quotes.

In one or more embodiments, the audio quote device 619 may be implemented on a device which plays the audio quotes as part of the execution of an application. For example, the audio quote device 619 may be implemented on the device 102 of FIG. 1 or the one or more devices 202 of FIG. 2. The audio quote device 619 may facilitate the processing of user commands requesting audio quotes for a book, series, author, or narrator. When the device with the audio quote device 619 receives audio quotes, the device may use the audio quote device 619 to facilitate the playback of the received audio quotes and to facilitate the processing of user answers identifying user guesses regarding which character a user attributes to a quote.

It is understood that the above are only a subset of what the audio quote device 619 may be configured to perform and that other functions included throughout this disclosure may also be performed by the audio quote device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
    determining, by an electronic device, a text file for an electronic book, wherein the text file comprises a starting quotation mark, an ending quotation mark, and text between the starting quotation mark and the ending quotation mark;
    determining, by the electronic device, a first location in the text file of the starting quotation mark;
    determining, by the electronic device, a second location in the text file of the ending quotation mark;
    determining, by the electronic device and using the first location and the second location, the text in between the starting quotation mark;
    determining, by the electronic device, that a verb occurs in the text file within a first threshold number of words of the first location or the second location;
    determining, by the electronic device, that the verb is a speaking word;
    determining, by the electronic device, a string that is nearest to the verb, wherein the string comprises a sequence of characters beginning with a capital letter;
    determining, by the electronic device, that the string occurs in the text file within a second threshold number of words from the verb;
    determining, by the electronic device, that the string matches a character name of a character in the electronic book;
    determining, by the electronic device, that the character name said the text;
    determining, by the electronic device, a first audio file comprising an audio representation of the text of the electronic book;
    determining, by the electronic device, a first word of the text between the starting quotation mark and the ending quotation mark, wherein the first word is at a third location in the text file that is nearest to the first location and is after the first location;
    determining, by the electronic device, a second word of the text between the starting quotation mark and the ending quotation mark, wherein the second word is at a fourth location in the text file that is nearest to the second location and is before the second location;
    determining, by the electronic device, a first time in the first audio file corresponding to the third location;
    determining, by the electronic device, a second time in the first audio file corresponding to the fourth location;
    generating, by the electronic device, a second audio file comprising audio beginning at the first time and ending at the second time; and
    sending, by the electronic device, the second audio file.

2. The method of claim 1, wherein the text file is a first text file, further comprising:
    generating a second text file, wherein generating the second text file comprises converting the second audio file to the second text file;
    comparing the second text file to the text in the first text file; and
    determining that the second text file matches the text in the first text file, wherein sending the second audio file is based on determining that the second text file matches the text in the first text file.

3. The method of claim 1, further comprising:
    determining an identifier for the electronic book;
    receiving a selection of the identifier; and
    identifying, based on the selection of the identifier, the second audio file, wherein sending the second audio file is based on the selection of the identifier.

4. The method of claim 1, wherein determining the string that is nearest to the verb comprises:
    determining a noun or a pronoun nearest to the verb;
    determining a location of the noun or the pronoun in the text file; and
    determining a capitalized string nearest to the location of the noun or pronoun, wherein the capitalized string is within the second threshold number of words from the verb.

5. A method, comprising:
    determining, by at least one processor of a device, a first quotation mark and a second quotation mark in a text file;
    determining, by the at least one processor, a string between the first quotation mark and the second quotation mark, wherein the string begins with a first word and concludes with a second word;
    determining, by the at least one processor, that a verb is within a first threshold number of words or characters from the first quotation mark or the second quotation mark, wherein the string excludes the verb;
    determining, by the at least one processor and based on the verb, that the string is attributed to a character name in the text file;
    determining, by the at least one processor, a first time in a first audio file, wherein the first audio file comprises an audio representation of the text file, and wherein the first time is associated with audio representation of the first word;
    determining, by the at least one processor, a second time in the first audio file, wherein the second time is associated with audio representation of the second word;
    generating, by the at least one processor, a second audio file, wherein generating the second audio file comprises extracting audio from the first audio file based on the first time and the second time; and
    storing the second audio file with an indication of the character name.

6. The method of claim 5, wherein determining the first time comprises identifying the first time in the text file, and wherein determining the second time comprises identifying the second time in the text file.

7. The method of claim 5, wherein the string is a first string, wherein determining that the first string is attributed to the character name comprises:

determining a second string that is nearest to the verb, wherein the second string comprises a sequence of characters beginning with a capital letter;

determining that the second string occurs in the text file within the first threshold number of words or characters of the verb; and determining that the second string matches the character name, wherein the character name is a name of a character in a book associated with the text file.

8. The method of claim 5, further comprising:

determining an identifier associated with the second audio file and the indication of the character name, wherein storing the second audio file and the indication of the character name further comprises storing the identifier associated with the second audio file and the character name; and determining, based on the identifier, a third audio file.

9. The method of claim 5, wherein the text file is a first text file, further comprising:

generating a second text file, wherein generating the second text file comprises converting the second audio file to the second text file;

comparing the second text file to the string; and determining that the second text file matches the string.

10. The method of claim 5, wherein the text file is a first text file, further comprising:

generating a second text file, wherein generating the second text file comprises converting the second audio file to the second text file;

comparing the second text file to the string;

determining that the second text file does not match the string; and discarding the second audio file based on determining that the second text file does not match the string.

11. The method of claim 5, wherein the text file comprises text of a book, further comprising:

determining an identifier for the book, wherein the identifier is associated with an application for one or more books comprising the book;

receiving a selection of the identifier; and identifying, based on the selection of the identifier, the second audio file, wherein storing the second audio file based on the selection of the identifier.

12. The method of claim 5, wherein the verb is a first verb, wherein determining that the string is attributed to the character name further comprises:

determining a second verb in the text file; and determining that the first verb is closer to at least one of the first quotation mark or the second quotation mark than the second verb.

13. The method of claim 5, wherein the verb is a first verb, wherein determining that the string is attributed to the character name further comprises:

determining a second verb in the text file;

determining that the second verb is not associated with a form of speech; and determining that the first verb is associated with a form of speech.

14. The method of claim 5, wherein the string is a first string, and wherein determining that the string is attributed to the character name further comprises:

determining a noun or a pronoun nearest to the verb, wherein the noun or pronoun is associated with an alias of the character name;

determining a location of the noun or the pronoun in the text file; and determining a second string nearest to the location of the noun or pronoun, wherein the second string is an alias associated with the character name.

15. The method of claim 5, wherein the string is a first string, further comprising:

determining a first number of words in the string;

determining that the first number of words in the string is within a second threshold number of words or characters;

determining a third quotation mark and a fourth quotation mark, wherein the third quotation mark and the fourth quotation mark are within the first threshold number of words or characters from the first string;

determining a second string between the third quotation mark and the fourth quotation mark;

determining that the verb is within the first threshold number of words or characters from the third quotation mark or the fourth quotation mark;

determining a second number of words in the second string;

determining that the first number of words and the second number of words combined exceeds a threshold number of words or characters; and determining that the second string is attributed to the character name, wherein generating the second audio file further comprises extracting, from the first audio file, audio associated with the second string.

16. The method of claim 5, wherein the character name is a first character name, and wherein the string is a first string, further comprising:

receiving an indication that the first string is improperly attributed to the first character name;

determining a second string, wherein the second string comprises a sequence of characters beginning with a capital letter;

determining that the second string occurs in the text file within a second threshold number of words or characters after the verb; and determining that the second string matches a second character name of a character in the text file; and sending the second audio file and an indication of the second character name.

17. The method of claim 5, further comprising:

receiving a request for one or more audio files;

determining that the character name is attributed to a number of strings, wherein the number of strings comprises the string; and determining that the number of strings exceeds a threshold number of strings, wherein storing the second audio file comprises storing two or more audio files, wherein the two or more audio files comprises the second audio file, and wherein a number of the two or more audio files is based on the number of strings.

18. A device comprising memory coupled to at least one processor, wherein the at least one processor is configured to:

determine a first quotation mark and a second quotation mark in a text file;

determine a string between the first quotation mark and the second quotation mark, wherein the string begins with a first word and concludes with a second word;

determine that a verb is within a first threshold number of words or characters from the first quotation mark or the second quotation mark, wherein the string excludes the verb;

determine, based on the verb, that the string is attributed to a character name in the text file;

determine a first time in a first audio file, wherein the first audio file comprises an audio representation of the text file, and wherein the first time is associated with audio representation of the first word;

determine a second time in the first audio file, wherein the second time is associated with audio representation of the second word; and extract audio from the first audio file based on the first time and the second time to generate a second audio file.

19. The device of claim 18, wherein the string is a first string, wherein to determine that the string is attributed to the character name comprises the at least one processor being further configured to:

determine a second string that is nearest to the verb, wherein the second string comprises a sequence of characters;

determine that the second string occurs in the text file within a second threshold number of words or characters after the verb; and determine that the second string matches the character name.

20. The device of claim 18, wherein to determine the first time comprises to identify the first time in the text file, and wherein to determine the second time comprises to identify the second time in the text file.

\* \* \* \* \*